G. G. LARSEN.
CABLE HANGER.
APPLICATION FILED MAR. 29, 1910.
976,470.
Patented Nov. 22, 1910.
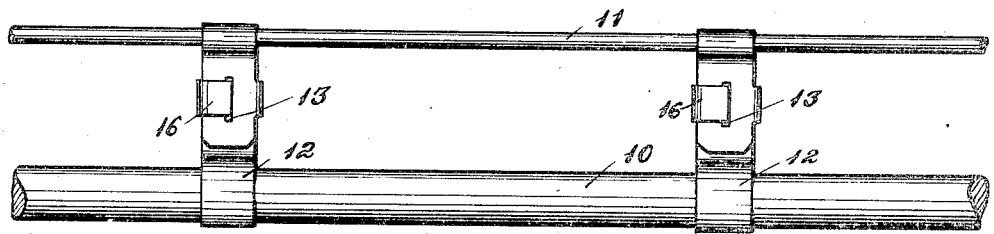
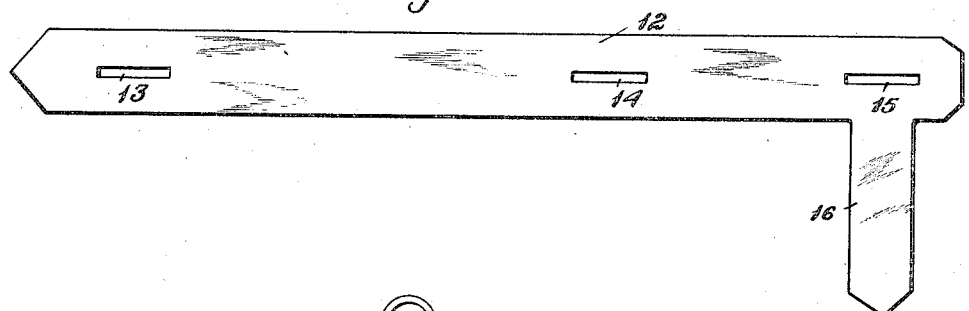
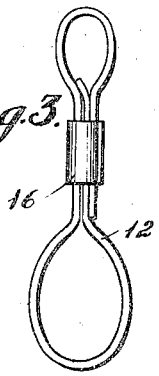
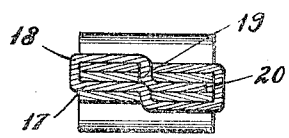
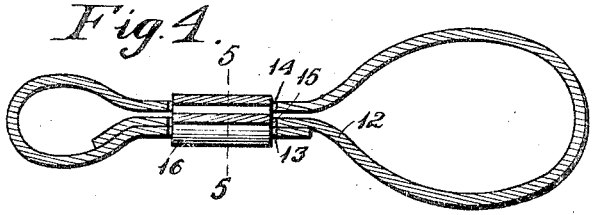
Witnesses
W. A. Softus.
F. C. Caswell
Inventor.
Gustav G. Larsen
by J. Ralph Orwig Atty

UNITED STATES PATENT OFFICE.

GUSTAV GEORGE LARSEN, OF STACYVILLE, IOWA.

CABLE-HANGER.

976,470.

Specification of Letters Patent. Patented Nov. 22, 1910.

Application filed March 29, 1910. Serial No. 552,263.

*To all whom it may concern:*

Be it known that I, GUSTAV G. LARSEN, a citizen of the United States, residing at Stacyville, in the county of Mitchell and State of Iowa, have invented a certain new and useful Cable-Hanger, of which the following is a specification.

The object of my invention is to provide a cable hanger of simple, durable and inexpensive construction, especially designed for use in connecting aerial telephone cables with supporting cables or wires.

More specifically it is my object to provide a device of this kind that may be formed complete of a single piece of sheet metal and that may be readily and easily shaped by hand to closely fit the supporting cable and the telephone cable and also so arranged that the operator may readily and easily, by hand, extend an integral tongue through slots in the overlapping portions of the hanger to thereby firmly and securely hold the overlapping portions of the hanger together so that the hanger cannot become loosened or unfastened by any of the strains to which devices of this kind are ordinarily subjected.

My invention consists in certain details, in the construction, arrangement and combination of the various parts of the device, whereby the objects contemplated are attained, as hereinafter more fully set forth, pointed out in my claims and illustrated in the accompanying drawings, in which:

Figure 1 shows a side elevation of a supporting wire and an aerial telephone cable and two of my improved cable hangers applied thereto. Fig. 2 shows a plan view of one of my improved hangers before being bent into shape. Fig. 3 shows an edge view of a hanger embodying my invention. Fig. 4 shows an enlarged, sectional view of same, and Fig. 5 shows a detail, sectional view through the line 5—5 of Fig. 4.

Referring to the accompanying drawings, I have used the reference numeral 10 to indicate an aerial telephone cable of the ordinary kind, and 11 a supporting wire for said cable.

My improved hanger is formed of a single piece of sheet metal, as shown in Fig. 5, and comprises a body portion 12 having three slots 13, 14 and 15 therein and also having a tongue 16 extended laterally from the body portion 12 at a point adjacent to the slot 15.

In applying my improved hanger to a supporting cable and a telephone cable, I proceed as follows: I first bend the hanger at a point midway between the slots 14 and 15 over the cable 11 and I then bend the hanger at a point between the slots 13 and 14 under the telephone cable thus bringing the central portion of the hanger and the two ends in overlapping positions with the slots 13, 14 and 15 in alinement with each other. I then bend the tongue 16 over the adjacent edges of the said overlapping parts of the hanger and insert its end through the slot 14 and out between the opposite sides of the part containing the slot 14 and the part containing the slot 13 as shown at 17 in Fig. 5. I then bend the tongue over the edges of the parts containing the slots 14, and 15, as shown at 18 in Fig. 5, and I finally insert the point of the tongue through the slot 15, as shown at 19 in Fig. 5, and the end of the tongue then projects between the parts containing the slots 13, and 14 as shown at 20 in Fig. 5.

The material of which the hanger is made is preferably of metal firm enough to support the weight of the cable 12 and yet flexible enough so that it may readily and easily bend by hand in the manner before described. After the said tongue is in position shown in the drawings, it is obvious that the overlapping parts of the hanger are prevented from spreading apart and it is also obvious that the tongue is firmly and securely held in position so that it cannot become loosened by any of the strains to which devices of this kind are ordinarily subjected.

I claim as my invention:

1. An improved cable hanger, formed of a single piece of sheet metal and provided with longitudinal slots near its ends and adjacent to its central portion, and an integral tongue extended laterally from one end of the hanger adjacent to the slot in said end of the hanger, for the purposes stated.

2. An improved cable hanger, formed complete of a single piece of bendable metal and provided with three slots arranged near its ends and near its central portion, and an integral tongue extended laterally from a point near one end, said parts being so arranged and proportioned that the metal may be bent between its central portion and one end to overlap a supporting cable and between its central portion and the other end to overlap a telephone cable and so that the central portion and the two ends will stand in overlapping positions with the slots therein in alinement with each other, and said tongue being capable of being inserted through said slots as required to hold the overlapping positions together, for the purposes stated.

Des Moines, Iowa, March 18, 1910.

GUSTAV GEORGE LARSEN.

Witnesses:
R. T. KRAUS,
KATIE WELTER.